US012708983B2

(12) United States Patent
Griesser et al.

(10) Patent No.: US 12,708,983 B2
(45) Date of Patent: Aug. 18, 2026

(54) METHOD AND APPARATUS FOR PRODUCING 3D MOLDINGS BY LAYERING TECHNOLOGY, USING A CORE CLEANING STATION

(71) Applicants: Voxeljet AG, Friedberg (DE); LORAMENDI, S.COOP, Vitoria-Gasteiz (ES)

(72) Inventors: Alfred Griesser, Augsburg (DE); Alexander Kudernatsch, Augsburg (DE); Luis Alfonso Fernandez Orive, Vitoria-Gasteiz (ES); Alesander Olea Abarrategui, Igorre (ES)

(73) Assignees: Voxeljet AG, Friedberg (DE); LORAMENDI, S.COOP, Vitoria-Gasteiz (ES)

( * ) Notice: Subject to any disclaimer, the term of this patent is extended or adjusted under 35 U.S.C. 154(b) by 725 days.

(21) Appl. No.: 17/618,251

(22) PCT Filed: Jun. 11, 2020

(86) PCT No.: PCT/DE2020/000127
§ 371 (c)(1),
(2) Date: Dec. 10, 2021

(87) PCT Pub. No.: WO2020/249150
PCT Pub. Date: Dec. 17, 2020

(65) Prior Publication Data

US 2022/0219289 A1 Jul. 14, 2022

(30) Foreign Application Priority Data

Jun. 13, 2019 (DE) ..................... 10 2019 004 122.4

(51) Int. Cl.
*B24C 1/08* (2006.01)
*B22F 10/20* (2021.01)
(Continued)

(52) U.S. Cl.
CPC ................ *B24C 1/08* (2013.01); *B22F 10/20* (2021.01); *B22F 10/68* (2021.01); *B22F 12/88* (2021.01);
(Continued)

(58) Field of Classification Search
CPC .. B24C 1/08; B24C 3/32; B24C 9/003; B24C 9/006; B29C 64/35; B22F 10/68; B22F 10/20; B22F 12/88; B33Y 40/20
(Continued)

(56) References Cited

U.S. PATENT DOCUMENTS

| | | |
|---|---|---|
| 4,247,508 A | 1/1981 | Housholder |
| 4,575,330 A | 3/1986 | Hull |

(Continued)

FOREIGN PATENT DOCUMENTS

| | | |
|---|---|---|
| AU | 720255 B2 | 5/2000 |
| CN | 101146666 A | 3/2008 |

(Continued)

OTHER PUBLICATIONS

Schrage; https://www.schrage.de/en/products/classic; published Nov. 6, 2010, last accessed Jul. 17, 2024; Screen capture image depicting tube chain conveyor transporting bead-like material. (Year: 2010).*

(Continued)

*Primary Examiner* — Nahida Sultana
(74) *Attorney, Agent, or Firm* — The Dobrusin Law Firm, P.C.

(57) ABSTRACT

The invention relates to a method and an apparatus for producing three-dimensional models by layering technology, using a core cleaning station.

27 Claims, 8 Drawing Sheets

(51) Int. Cl.
*B22F 10/68* (2021.01)
*B22F 12/88* (2021.01)
*B24C 3/32* (2006.01)
*B24C 9/00* (2006.01)
*B29C 64/35* (2017.01)
*B33Y 40/20* (2020.01)

(52) U.S. Cl.
CPC ................ *B24C 3/32* (2013.01); *B24C 9/003* (2013.01); *B24C 9/006* (2013.01); *B29C 64/35* (2017.08); *B33Y 40/20* (2020.01)

(58) Field of Classification Search
USPC .......................................................... 264/162
See application file for complete search history.

(56) References Cited

U.S. PATENT DOCUMENTS 4,665,492 A 5/1987 Masters
4,752,352 A 6/1988 Feygin
4,752,498 A 6/1988 Fudim
4,944,817 A 7/1990 Bourell et al.
5,017,753 A 5/1991 Deckard
5,031,120 A 7/1991 Pomerantz et al.
5,047,182 A 9/1991 Sundback et al.
5,059,266 A 10/1991 Yamane et al.
5,120,476 A 6/1992 Scholz
5,126,529 A 6/1992 Weiss et al.
5,127,037 A 6/1992 Bynum
5,134,569 A 7/1992 Masters
5,136,515 A 8/1992 Helinski
5,149,548 A 9/1992 Yamane et al.
5,155,324 A 10/1992 Deckard et al.
5,156,697 A 10/1992 Bourell et al.
5,248,456 A 9/1993 Evans, Jr. et al.
5,252,264 A 10/1993 Forderhase et al.
5,284,695 A 2/1994 Barlow et al.
5,342,919 A 8/1994 Dickens, Jr. et al.
5,352,405 A 10/1994 Beaman et al.
5,387,380 A 2/1995 Cima et al.
5,398,193 A 3/1995 deAngelis
5,503,785 A 4/1996 Crump et al.
5,518,060 A 5/1996 Cleary et al.
5,518,680 A 5/1996 Cima et al.
5,555,176 A 9/1996 Menhennett et al.
5,637,175 A 6/1997 Feygin et al.
5,639,070 A 6/1997 Deckard
5,639,402 A 6/1997 Barlow et al.
5,647,931 A 7/1997 Retallick et al.
5,658,412 A 8/1997 Retallick et al.
5,665,401 A 9/1997 Serbin et al.
5,717,599 A 2/1998 Menhennett et al.
5,730,925 A 3/1998 Mattes et al.
5,740,051 A 4/1998 Sanders, Jr. et al.
5,749,041 A 5/1998 Lakshminarayan et al.
5,753,274 A 5/1998 Wilkening et al.
5,824,250 A 10/1998 Whalen
5,851,465 A 12/1998 Bredt
5,884,688 A 3/1999 Hinton et al.
5,902,537 A 5/1999 Almquist et al.
5,934,343 A 8/1999 Gaylo et al.
5,940,674 A 8/1999 Sachs et al.
5,943,235 A 8/1999 Earl et al.
5,989,476 A 11/1999 Lockard et al.
6,048,188 A 4/2000 Hull et al.
6,048,954 A 4/2000 Barlow et al.
6,146,567 A 11/2000 Sachs et al.
6,147,138 A 11/2000 Hochsmann et al.
6,155,331 A 12/2000 Langer et al.
6,164,850 A 12/2000 Speakman
6,165,406 A 12/2000 Jang et al.
6,169,605 B1 1/2001 Penn et al.
6,193,922 B1 2/2001 Ederer
6,210,625 B1 4/2001 Matsushita
6,217,816 B1 4/2001 Tang
6,243,616 B1 6/2001 Droscher et al.
6,259,962 B1 7/2001 Gothait
6,270,335 B2 8/2001 Leyden et al.
6,305,769 B1 10/2001 Thayer et al.
6,335,097 B1 1/2002 Otsuka et al.
6,375,874 B1 4/2002 Russell et al.
6,403,002 B1 6/2002 Van Der Geest
6,405,095 B1 6/2002 Jang et al.
6,423,255 B1 7/2002 Hoechsmann et al.
6,500,378 B1 12/2002 Smith
6,554,600 B1 4/2003 Hofmann et al.
6,596,224 B1 7/2003 Sachs et al.
6,658,314 B1 12/2003 Gothait
6,672,343 B1 1/2004 Perret et al.
6,713,125 B1 3/2004 Sherwood et al.
6,722,872 B1 4/2004 Swanson et al.
6,733,528 B2 5/2004 Abe et al.
6,827,988 B2 12/2004 Krause et al.
6,830,643 B1 12/2004 Hayes
6,838,035 B1 1/2005 Ederer et al.
6,896,839 B2 5/2005 Kubo et al.
7,083,411 B2 * 8/2006 Flemmig ................ A61Q 11/00 424/49
7,120,512 B2 10/2006 Kramer et al.
7,153,463 B2 12/2006 Leuterer et al.
7,291,002 B2 11/2007 Russell et al.
7,296,990 B2 11/2007 Devos et al.
7,332,537 B2 2/2008 Bredt et al.
7,348,075 B2 3/2008 Farr et al.
7,378,052 B2 5/2008 Harryson
7,455,805 B2 11/2008 Oriakhi et al.
7,497,977 B2 3/2009 Nielsen et al.
7,597,835 B2 10/2009 Marsac
7,641,461 B2 1/2010 Khoshnevis
7,790,096 B2 9/2010 Merot et al.
7,799,253 B2 9/2010 Höschmann et al.
8,186,415 B2 5/2012 Marutani et al.
8,574,485 B2 11/2013 Kramer
8,951,033 B2 2/2015 Höchsmann et al.
9,327,450 B2 5/2016 Hein et al.
11,458,591 B2 * 10/2022 Johnson ................ B33Y 40/20
2001/0045678 A1 11/2001 Kubo et al.
2001/0050031 A1 12/2001 Bredt et al.
2002/0015783 A1 2/2002 Harvey
2002/0016387 A1 2/2002 Shen
2002/0026982 A1 3/2002 Bredt et al.
2002/0079601 A1 6/2002 Russell et al.
2002/0090410 A1 7/2002 Tochimoto et al.
2002/0111707 A1 8/2002 Li et al.
2002/0155254 A1 10/2002 McQuate et al.
2002/0167100 A1 11/2002 Moszner et al.
2003/0004599 A1 1/2003 Herbak
2003/0083771 A1 5/2003 Schmidt
2003/0114936 A1 6/2003 Sherwood et al.
2004/0003738 A1 1/2004 Imiolek et al.
2004/0012112 A1 1/2004 Davidson et al.
2004/0025905 A1 2/2004 Ederer et al.
2004/0026418 A1 2/2004 Ederer et al.
2004/0035542 A1 2/2004 Ederer et al.
2004/0036200 A1 2/2004 Patel et al.
2004/0038009 A1 2/2004 Leyden et al.
2004/0045941 A1 3/2004 Herzog et al.
2004/0056378 A1 3/2004 Bredt et al.
2004/0094058 A1 5/2004 Kasperchik et al.
2004/0112523 A1 6/2004 Crom
2004/0145088 A1 7/2004 Patel et al.
2004/0170765 A1 9/2004 Ederer et al.
2004/0187714 A1 9/2004 Napadensky et al.
2004/0207123 A1 10/2004 Patel et al.
2004/0239009 A1 12/2004 Collins et al.
2005/0003189 A1 1/2005 Bredt et al.
2005/0017386 A1 1/2005 Harrysson
2005/0017394 A1 1/2005 Hochsmann et al.
2005/0074511 A1 4/2005 Oriakhi et al.
2005/0079086 A1 4/2005 Farr
2005/0093194 A1 5/2005 Oriakhi et al.
2005/0167872 A1 8/2005 Tsubaki et al.
2005/0174407 A1 8/2005 Johnson et al.
2005/0179167 A1 8/2005 Hachikian

(56) References Cited

U.S. PATENT DOCUMENTS

2005/0212163 A1 9/2005 Bausinger et al.
2005/0218549 A1 10/2005 Farr et al.
2005/0276976 A1 12/2005 Pfeifer et al.
2005/0280185 A1 12/2005 Russell et al.
2006/0012058 A1 1/2006 Hasei
2006/0103054 A1 5/2006 Pfeifer et al.
2006/0105102 A1 5/2006 Hochsmann et al.
2006/0159896 A1 7/2006 Pfeifer et al.
2006/0175346 A1 8/2006 Ederer et al.
2006/0208388 A1 9/2006 Bredt et al.
2006/0237159 A1 10/2006 Hochsmann
2006/0251535 A1 11/2006 Pfeifer et al.
2006/0254467 A1 11/2006 Farr et al.
2006/0257579 A1 11/2006 Farr et al.
2007/0045891 A1 3/2007 Martinoni
2007/0057412 A1 3/2007 Weiskopf et al.
2007/0126157 A1 6/2007 Bredt
2007/0238056 A1 10/2007 Baumann et al.
2007/0241482 A1 10/2007 Giller et al.
2008/0001331 A1 1/2008 Ederer
2008/0003390 A1 1/2008 Hayashi
2008/0018018 A1 1/2008 Nielsen et al.
2008/0047628 A1 2/2008 Davidson et al.
2008/0138515 A1 6/2008 Williams
2008/0187711 A1 8/2008 Alam et al.
2008/0233302 A1 9/2008 Elsner et al.
2008/0241404 A1 10/2008 Allaman et al.
2008/0260945 A1 10/2008 Ederer et al.
2008/0299321 A1 12/2008 Ishihara
2009/0068376 A1 3/2009 Philippi et al.
2010/0007048 A1 1/2010 Schweininger
2010/0007062 A1 1/2010 Larsson et al.
2010/0207288 A1 8/2010 Dini
2010/0212584 A1 8/2010 Ederer et al.
2010/0244301 A1 9/2010 Ederer et al.
2010/0247742 A1 9/2010 Shi et al.
2010/0272519 A1 10/2010 Ederer et al.
2010/0279007 A1 11/2010 Briselden et al.
2010/0291314 A1 11/2010 Kahani-Shirazi
2010/0323301 A1 12/2010 Tang et al.
2011/0049739 A1 3/2011 Uckelmann et al.
2011/0059247 A1 3/2011 Kuzusako et al.
2011/0177188 A1 7/2011 Bredt et al.
2011/0223437 A1 9/2011 Ederer et al.
2012/0046779 A1 2/2012 Pax et al.
2012/0097258 A1 4/2012 Harmann et al.
2012/0113439 A1 5/2012 Ederer et al.
2012/0126457 A1 5/2012 Abe et al.
2012/0291701 A1 11/2012 Grasegger et al.
2013/0000549 A1 1/2013 Hartmann et al.
2013/0004610 A1 1/2013 Hartmann et al.
2013/0026680 A1 1/2013 Ederer et al.
2013/0029001 A1 1/2013 Gunther et al.
2013/0029563 A1* 1/2013 Halstenberg .......... B24C 11/005 451/88
2013/0052291 A1* 2/2013 Morikawa .............. B33Y 40/20 425/135
2013/0199444 A1 8/2013 Hartmann
2013/0234355 A1 9/2013 Hartmann et al.
2013/0302575 A1 11/2013 Mogele et al.
2014/0048980 A1 2/2014 Crump et al.
2014/0065194 A1 3/2014 Yoo
2014/0212677 A1 7/2014 Gnuchtel et al.
2014/0227123 A1 8/2014 Gunster
2014/0271961 A1 9/2014 Khoshnevis
2014/0306379 A1 10/2014 Hartmann et al.
2015/0042018 A1 2/2015 Gunther et al.
2015/0110910 A1 4/2015 Hartmann et al.
2015/0224718 A1 8/2015 Ederer et al.
2015/0266238 A1 9/2015 Ederer et al.
2015/0273572 A1 10/2015 Ederer et al.
2015/0290881 A1 10/2015 Ederer et al.
2015/0375419 A1 12/2015 Gunther et al.
2016/0083300 A1* 3/2016 Ide ........................ B29C 64/153 428/448
2016/0236422 A1 8/2016 Sakura
2016/0263828 A1 9/2016 Ederer et al.
2016/0303762 A1 10/2016 Gunther
2016/0311167 A1 10/2016 Gunther et al.
2016/0311210 A1 10/2016 Gunther et al.
2016/0318251 A1 11/2016 Ederer et al.
2017/0050378 A1 2/2017 Ederer
2017/0051864 A1* 2/2017 Gillanders .............. F16L 58/02
2017/0106595 A1 4/2017 Gunther et al.
2017/0151727 A1 6/2017 Ederer et al.
2017/0157852 A1 6/2017 Ederer et al.
2017/0182711 A1 6/2017 Gunther et al.
2017/0210037 A1 7/2017 Ederer et al.
2017/0297263 A1 10/2017 Ederer et al.
2017/0305139 A1 10/2017 Hartmann
2017/0355137 A1 12/2017 Ederer et al.
2018/0079133 A1 3/2018 Ederer et al.
2018/0141271 A1 5/2018 Gunter et al.
2018/0193887 A1 7/2018 Poucher et al.
2018/0243883 A1* 8/2018 Brandl ...................... B24C 1/06
2018/0297284 A1* 10/2018 Fulop ...................... B29C 64/35
2018/0326662 A1 11/2018 Gunther et al.
2018/0369910 A1 12/2018 Gunter et al.
2019/0047218 A1 2/2019 Ederer et al.
2019/0084229 A1 3/2019 Gunther
2019/0126555 A1 5/2019 Lebed
2020/0055246 A1 2/2020 Gunther et al.
2020/0130263 A1 4/2020 Gunther et al.
2020/0189259 A1 6/2020 Hartmann et al.
2020/0262141 A1 8/2020 Ederer et al.
2021/0001401 A1* 1/2021 Shaarawi ............... B33Y 30/00
2021/0146621 A1* 5/2021 Olausson .................. B24C 1/08
2021/0316507 A1 10/2021 Grasegger et al.
2022/0143925 A1* 5/2022 Schalk .................... B22F 10/73
2022/0258412 A1 8/2022 Scheck et al.
2022/0288849 A1 9/2022 Ederer et al.
2022/0363000 A1 11/2022 Heymel et al.
2022/0371267 A1 11/2022 Gnuchtel et al.
2022/0379553 A1 12/2022 Hoppman et al.
2022/0388247 A1 12/2022 Heymel et al.
2022/0402203 A1 12/2022 Scheck et al.
2022/0402209 A1 12/2022 Heymel et al.
2024/0091906 A1* 3/2024 Singh ........................ B24C 9/00
2024/0100652 A1* 3/2024 Spes ..................... B24C 11/005

FOREIGN PATENT DOCUMENTS

DE 3221357 A1 12/1983
DE 3930750 C2 3/1991
DE 4102260 A1 7/1992
DE 4305201 C1 4/1994
DE 4 325 573 A1 2/1995
DE 29506204 U1 6/1995
DE 4440397 9/1995
DE 19530295 C1 1/1997
DE 19528215 A1 2/1997
DE 29701279 U1 5/1997
DE 19545167 A1 6/1997
DE 69031808 T2 4/1998
DE 19853834 5/2000
DE 69634921 T2 12/2005
DE 201 22 639 U1 11/2006
DE 102006040305 A1 3/2007
DE 102006029298 A1 12/2007
DE 102007040755 A1 3/2009
DE 102007047326 A1 4/2009
DE 102011053205 A1 3/2013
DE 202016003042 U1 7/2016
DE 102017200773 A1 7/2018
EP 0361847 B1 4/1990
EP 0431924 A2 12/1991
EP 1415792 5/2004
EP 1457590 A 9/2004
EP 2202016 A1 6/2010
EP 3202534 A1 8/2017
GB 2297516 A 8/1996
GB 2575544 A 1/2020
JP S62275734 A 11/1987
JP 2003/136605 A 5/2003

(56) References Cited

FOREIGN PATENT DOCUMENTS

| | | | | |
|---|---|---|---|---|
| JP | 2004/082206 A | 3/2004 | | |
| JP | 2009/202451 A | 9/2009 | | |
| WO | 90/03893 A1 | 4/1990 | | |
| WO | 01/40866 A2 | 6/2001 | | |
| WO | 2004/014637 A1 | 2/2004 | | |
| WO | 2006/100166 A1 | 9/2006 | | |
| WO | 2008/049384 A1 | 5/2008 | | |
| WO | 2008/061520 A2 | 5/2008 | | |
| WO | 2011/063786 A1 | 6/2011 | | |
| WO | 2013/075696 A1 | 5/2013 | | |
| WO | 2014/090207 A1 | 6/2014 | | |
| WO | 2014/166469 A1 | 10/2014 | | |
| WO | 2016/019942 A1 | 2/2016 | | |
| WO | 2017/008777 A1 | 1/2017 | | |
| WO | WO-2017192140 A1 * | 11/2017 | ......... | B23K 26/0006 |
| WO | 2019/027404 A1 | 2/2019 | | |

OTHER PUBLICATIONS

Cima et al., “Computer-derived Microstructures by 3D Printing: Bio- and Structural Materials,” SFF Symposium, Austin, TX, 1994.

Feature Article—Rapid Tooling—Cast Resin and Sprayed Metal Tooling by Joel Segal, Apr. 2000.

International Search Report and Written Opinion, PCT Application No. PCT/DE2020/000127, dated Aug. 14, 2020.

International Preliminary Report on Patentability, PCT Application No. PCT/DE2020/000127, dated Dec. 14, 2021.

Jacobs et al., 2005 SME Technical Paper, title “Are QuickCast Patterns Suitable for Limited Production?”.

Marcus et al., Solid Freedom Fabrication Proceedings, Nov. 1993.

Marcus, et al., Solid Freeform Fabrication Proceedings, Sep. 1995, pp. 130-133.

Sachs et al., “Three-Dimensional Printing: Rapid Tooling and Prototypes Directly from a CAD Model”, Massachusetts Institute of Technology, pp. 143-151, Jan. 1990.

Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.

Screen shots of URL: http://www.youtube.com/watch?v=hgIrNXZjIxU taken in approximately 5 second intervals on Nov. 12, 2015.

Williams, “Feasibility Study of Investment Casting Pattern Design by Means of Three Dimensional Printing”, Department of Mechanical Engineering, abstract only; Sep. 25, 2001.

* cited by examiner 10
1
2
3
4
6

METHOD AND APPARATUS FOR PRODUCING 3D MOLDINGS BY LAYERING TECHNOLOGY, USING A CORE CLEANING STATION

CLAIM OF PRIORITY

This application is a national phase filing under 35 USC § 371 from PCT Application serial number PCT/DE2020/000127 filed on Jun. 11, 2020, and claims priority therefrom. This application further claims priority to German Patent Application Number DE 10 2019 004 122.4, filed on Jun. 13, 2019. The contents of PCT/DE2020/00127 and DE 10 2019 004 122.4 are each incorporated herein by reference in its entirety.

FIELD

The invention relates to a method and an apparatus for producing three-dimensional models by layering technology using a core cleaning station.

BACKGROUND

European Patent EP 0 431 924 B1 describes a process for producing three-dimensional objects based on computer data. In the process, a thin layer of particulate material is deposited on a platform and has a binder material selectively printed thereon by means of a print head. The particulate region with the binder printed thereon bonds and solidifies under the influence of the binder and, optionally, an additional hardener. Next, the platform is lowered by one layer thickness into a construction cylinder and provided with a new layer of particulate material, the latter also being printed on as described above. These steps are repeated until a certain desired height of the object is achieved. Thus, the printed and solidified regions form a three-dimensional object.

Upon completion, said object made of solidified particulate material is embedded in loose particulate material, from which it subsequently has to be freed. Until now, this has been done manually and is very time-consuming and therefore very cost-intensive. The parts are freed from residual powder, for example, by means of a suction device and/or by simple brushing.

It was therefore an object of the present invention to provide constructional means allowing improved 3D printing process flows or at least improving or altogether avoiding the disadvantages of the prior art.

Another object of the present invention was to provide means for automating the cleaning step, thus helping to save labor and costs.

A further object of the present invention was to provide an improved 3D printing method in which various work steps are automated and assembly line production in 3D printing can be achieved at least in part.

SUMMARY OF THE INVENTION

In one aspect, the invention relates to a core cleaning station for cleaning 3D moldings, comprising a housing having an opening which is optionally closable or comprises a means for closing and means for generating a bead jet and an air jet and a deposit surface or/and a support for the 3D molding.

In another aspect, the invention relates to a 3D printing apparatus comprising an attached cleaning station (core cleaning station).

In a further aspect, the invention relates to a method for manufacturing 3D moldings, wherein at least one cleaning step is performed in an automated or semi-automated manner.

BRIEF DESCRIPTION OF THE DRAWINGS

Figure 2:
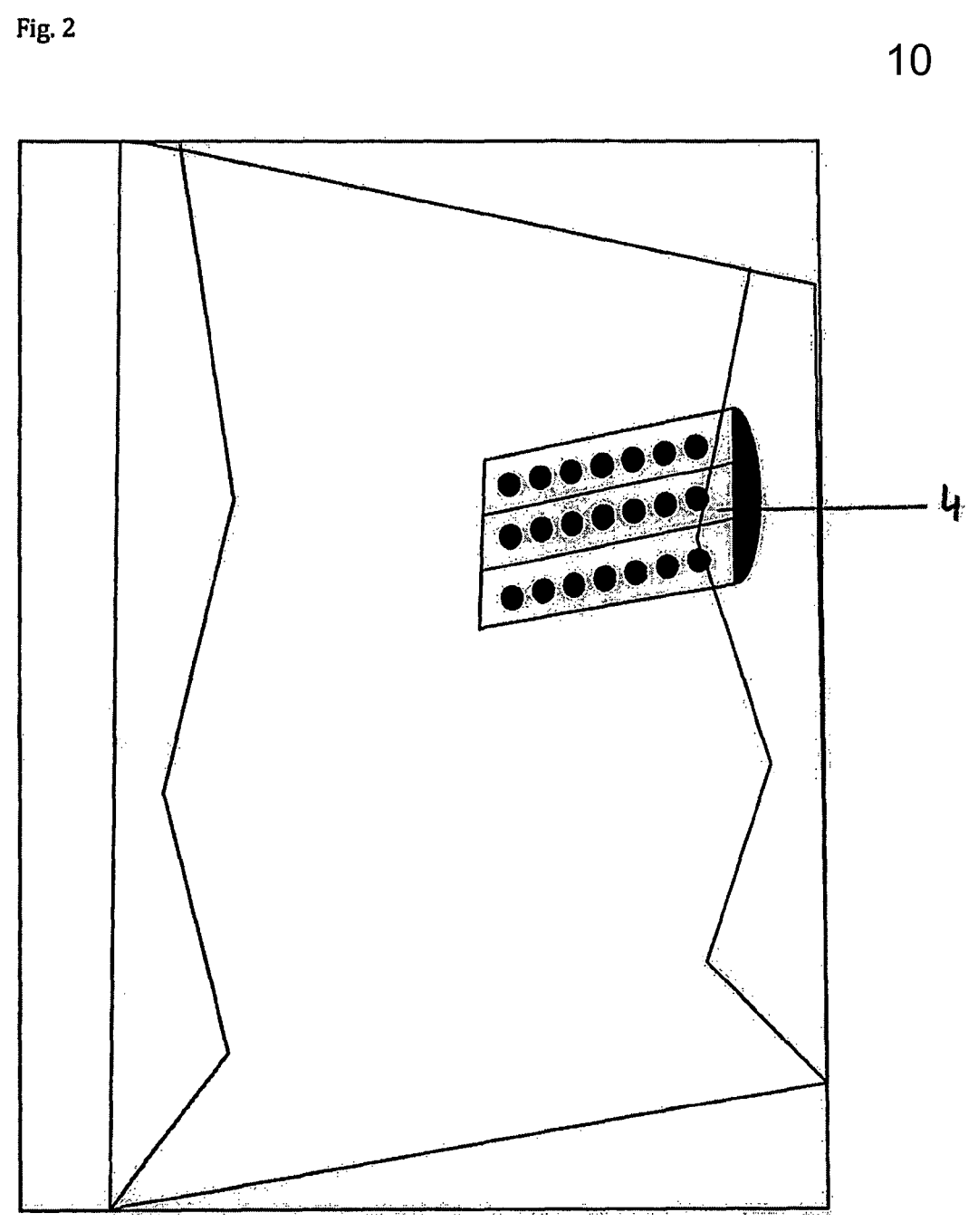

FIG. 2 shows the view into the core cleaning station (10) with adjustable air nozzles (4).

DETAILED DESCRIPTION

Figure 1:
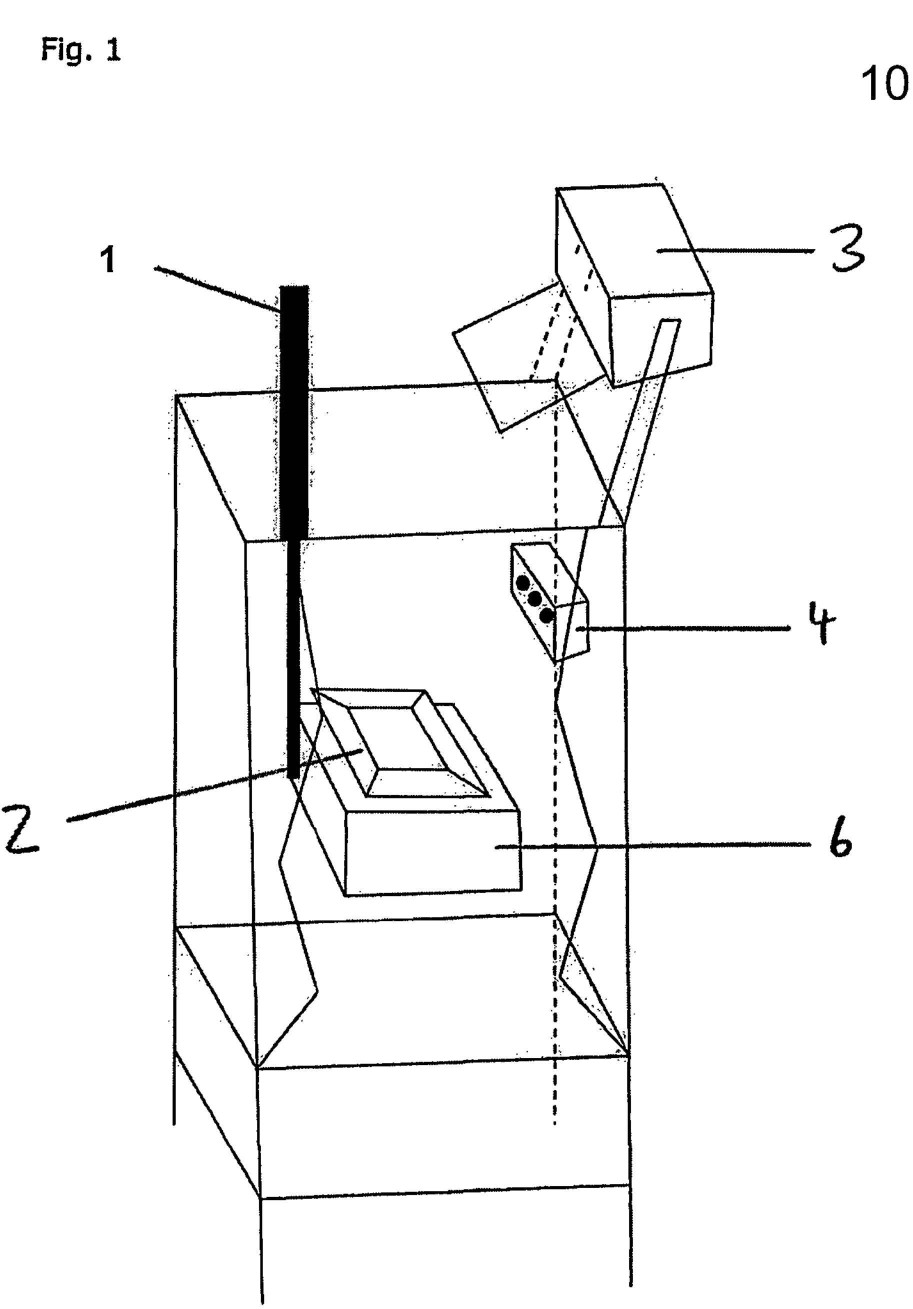
FIG. 1 shows a configuration example of a cleaning station (core cleaning station) (10).
Figure 3:
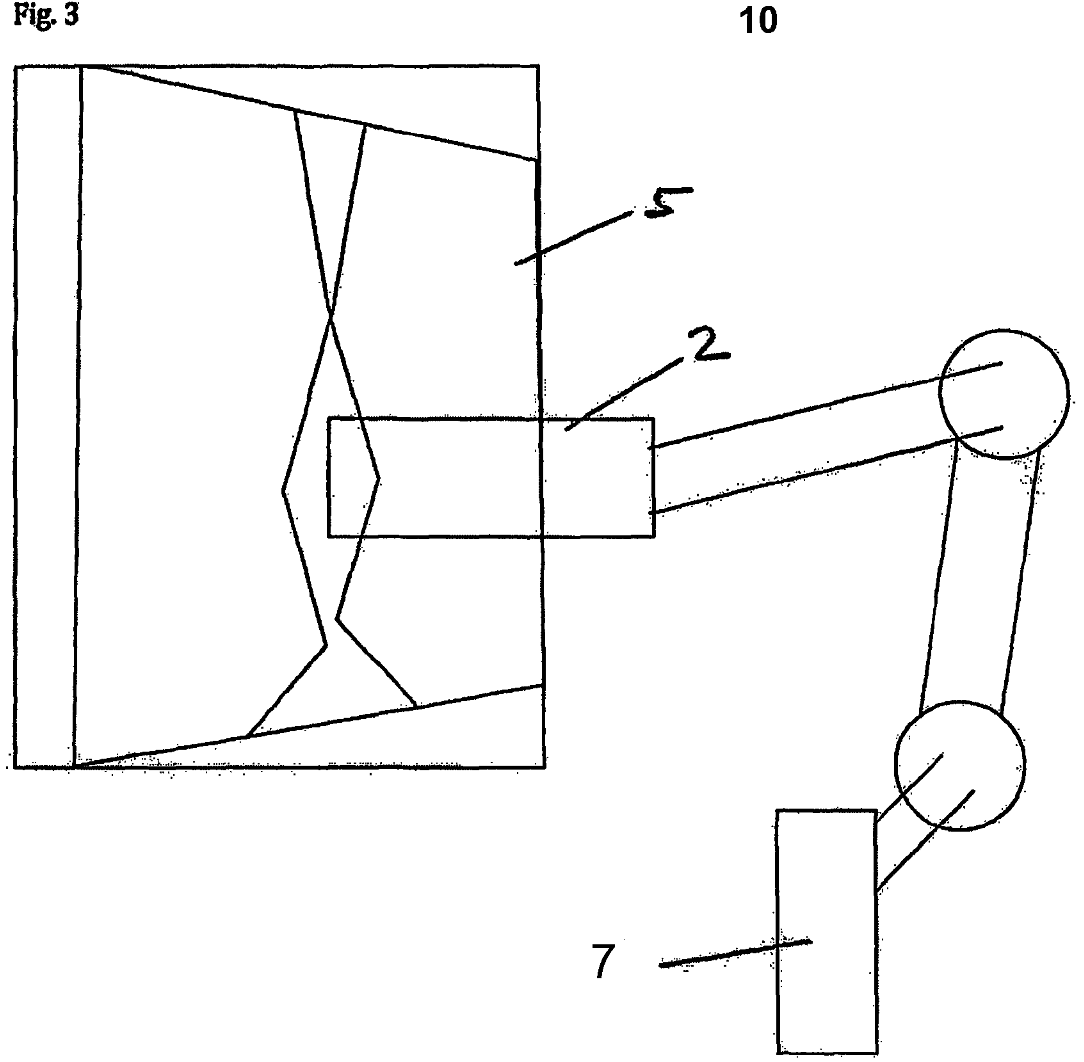
FIG. 3 shows a part of a handling robot (7) with a swivel arm.
Figure 4A:
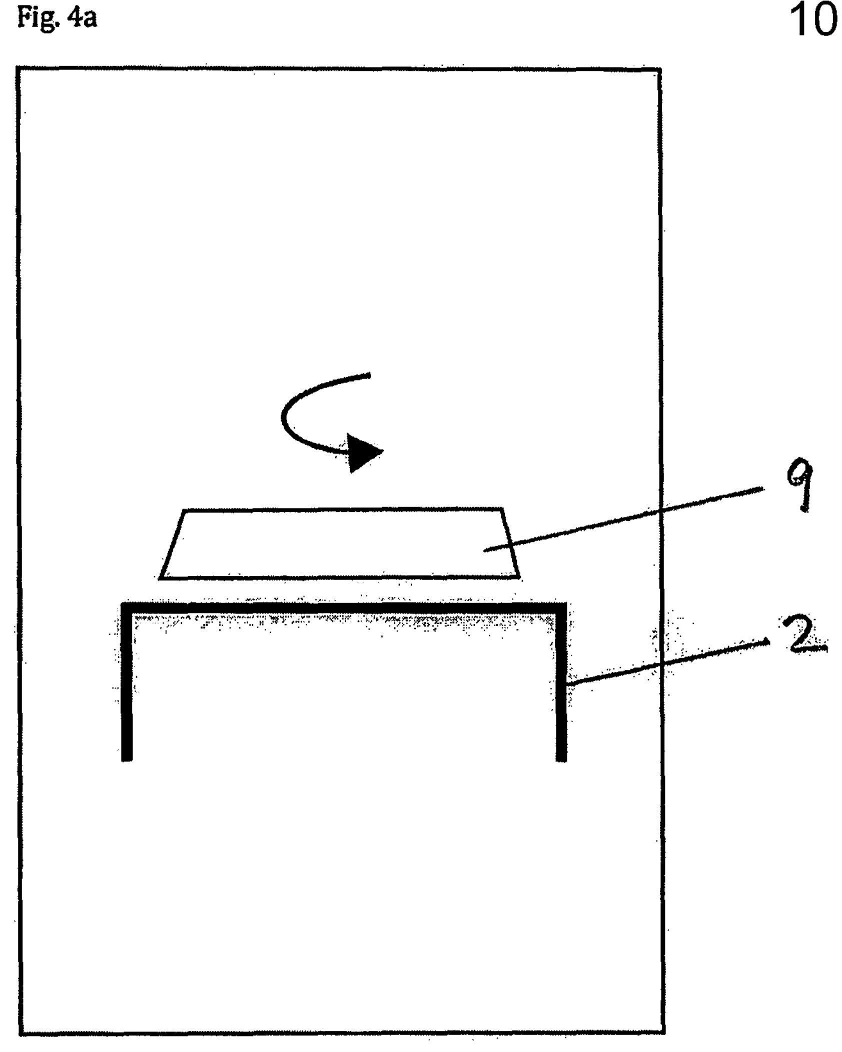
FIGS. 4*a* and 4*b* schematically illustrate a 3D molding (9) on a core support (2) and on the swivel arm of a handling robot (7), respectively.
Figure 4B:
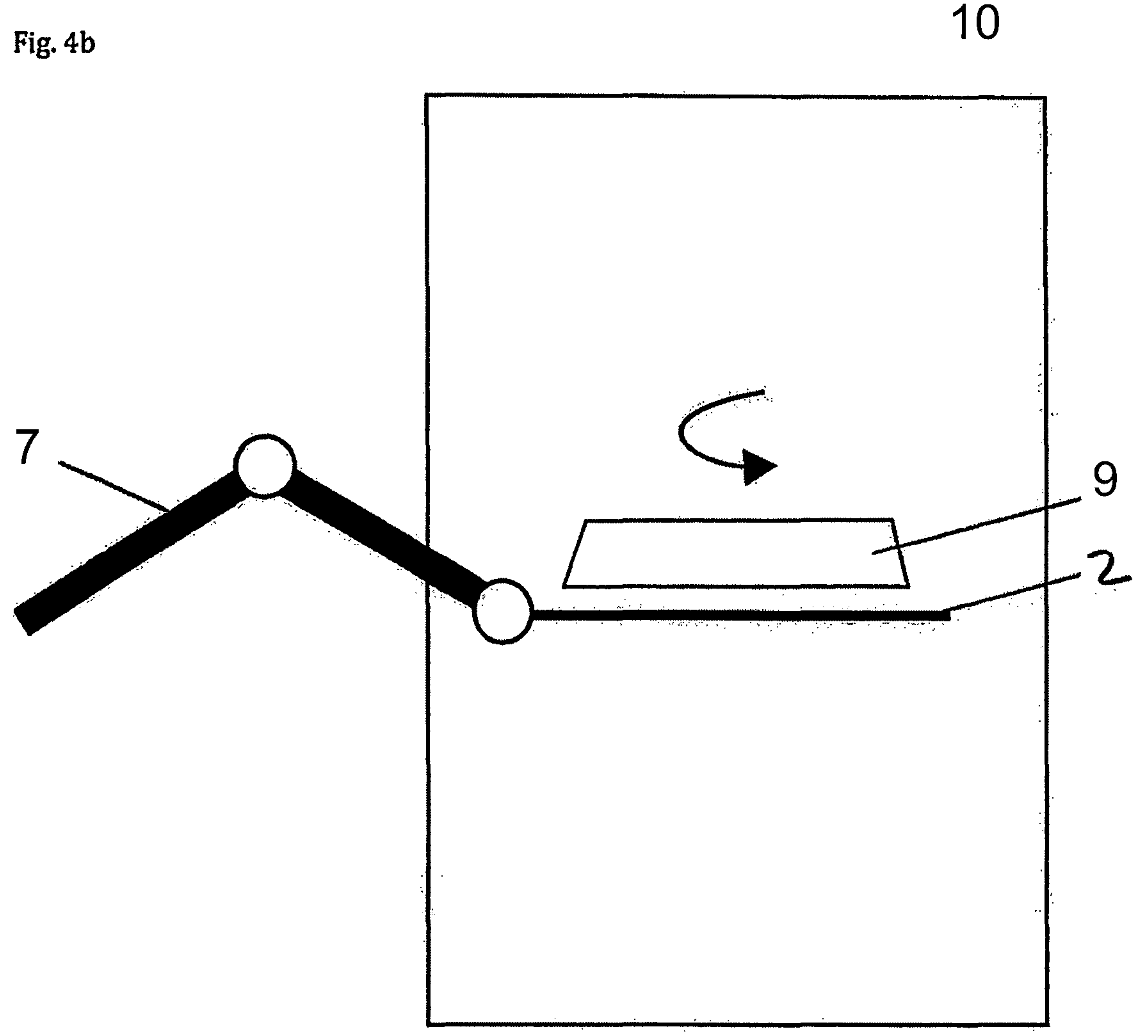
Figure 5A:
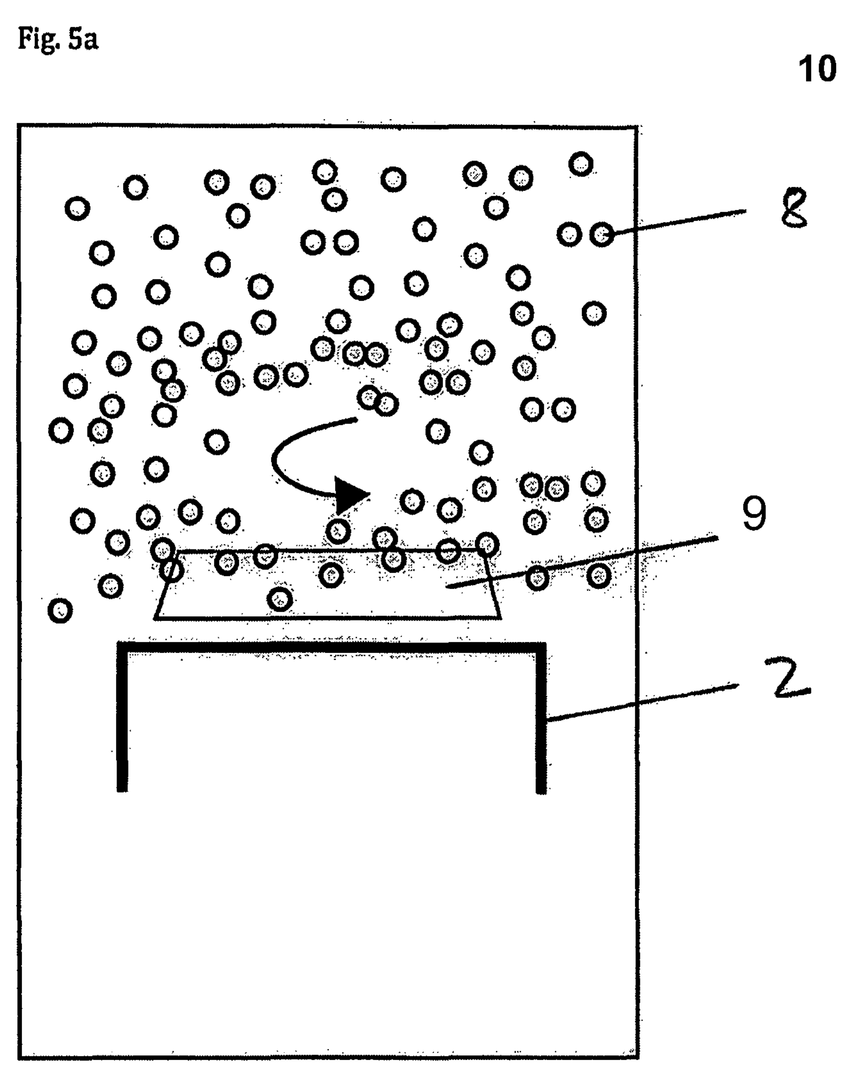
FIGS. 5*a* and 5*b* illustrate a 3D molding (9) subjected to bead blasting (8) and immersed in a bead bath in a container (6), respectively.
Figure 5B:
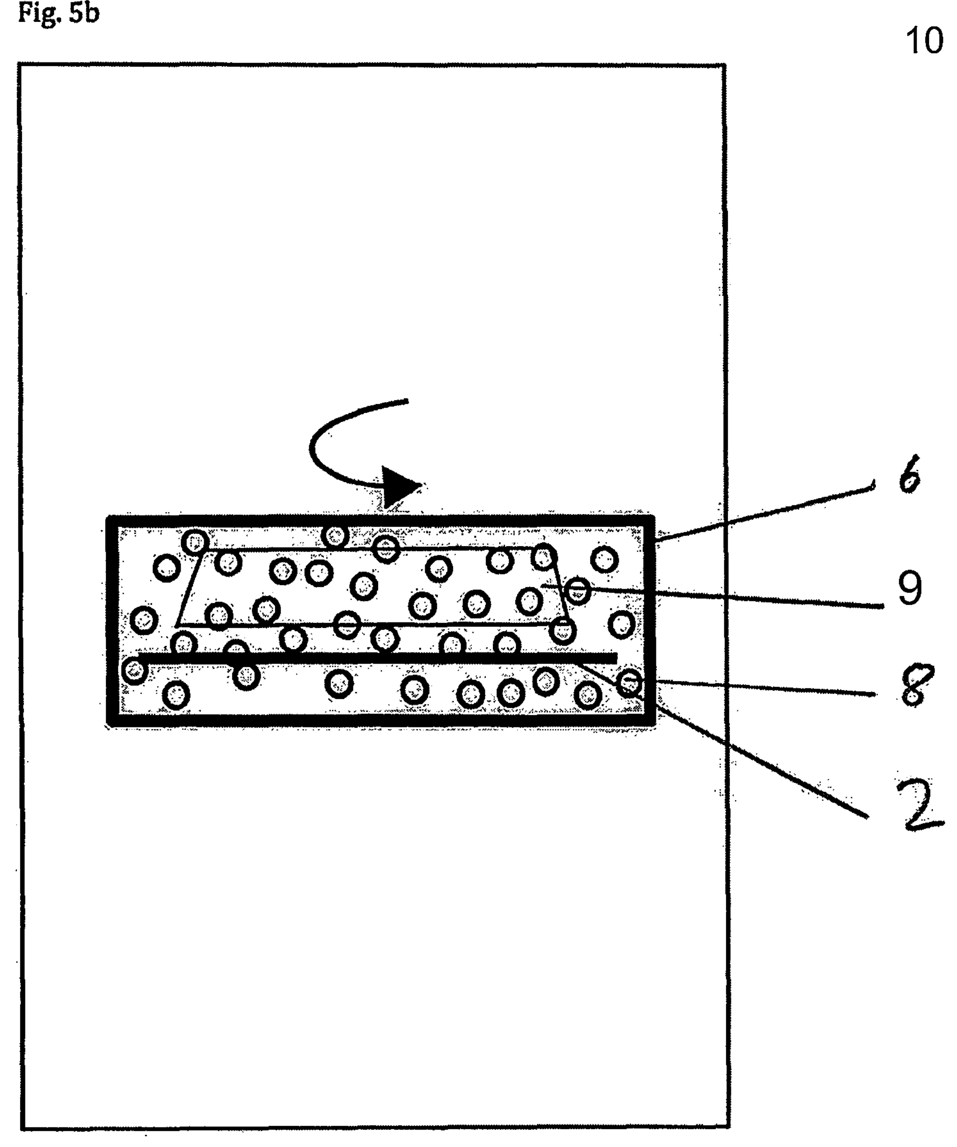
Figure 6:
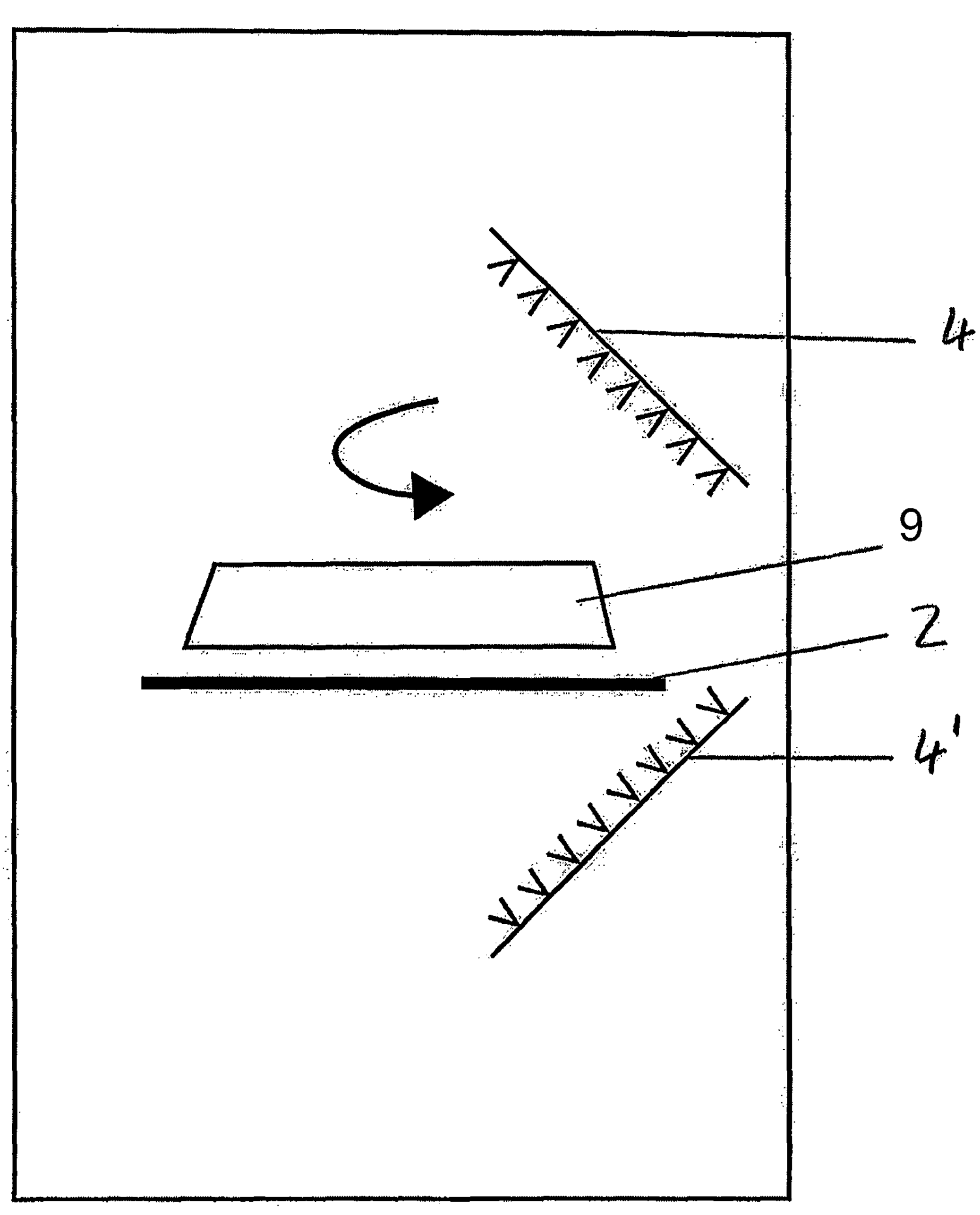
FIG. 6 shows how the 3D molding (9) on the core support (2) is exposed to an air jet by means of adjustable air nozzles (4) for further cleaning and removal of unsolidified particulate material.

According to the invention, a problem underlying the application is solved by providing a core cleaning station capable of cleaning a manufactured 3D molding substantially semi-automatically or automatically, and by a method using such a core cleaning station.

First of all, several terms according to the invention will be explained in more detail below.

A "3D molding", "molded article" or "part" in the sense of the invention means any three-dimensional object manufactured by means of the method according to the invention or/and the apparatus according to the invention and exhibiting dimensional stability.

"Construction space" is the geometric location where the particulate material bed grows during the construction process by repeated coating with particulate material or through which the bed passes when applying continuous principles. The construction space is generally bounded by a bottom, i.e. the construction platform, by walls and an open top surface, i.e. the construction plane. In continuous principles, there usually are a conveyor belt and limiting side walls. The construction space can also be designed in the form of what is called a job box, which constitutes a unit that can be moved in and out of the device and allows batch production, with one job box being moved out after completion of a process to allow a new job box to be moved into the device immediately, thereby increasing both the production volume and, consequently, the performance of the device.

"Construction platform" or "construction field" as used in the disclosure means the surface to which the particulate material is applied and on which the particulate material is selectively solidified to build up a predetermined three-dimensional molding.

The "particulate materials" or "particulate construction materials" or "construction materials" of use herein may be any materials known for powder-based 3D printing, in particular polymers, ceramics and metals. The particulate material is preferably a free-flowing powder when dry, but may also be a cohesive, cut-resistant powder or a particlecharged liquid. In this specification, particulate material and powder are used synonymously.

The "particulate material application" is the process of generating a defined layer of powder. This may be done either on the construction platform or on an inclined plane relative to a conveyor belt in continuous principles. The particulate material application will also be referred to below as "coating" or "recoating".

"Selective liquid application" in the sense of the invention may be effected after each particulate material application or irregularly, depending on the requirements for the molded article and for optimization of the molded article production, e.g. several times with respect to particulate material application. In this case, a sectional image is printed by the desired article.

The "device" used for carrying out the method according to the invention may be any known 3D-printing apparatus which includes the required parts. Common components include recoater, construction field, means for moving the construction field or other parts in continuous processes, metering devices and heating and/or irradiating means and other parts which are known to the person skilled in the art and will therefore not be described in detail herein. These apparatus components are combined with a core cleaning station for the cleaning step.

The "packing density" describes the filling of the geometric space by a solid. It depends on the nature of the particulate material and the application device and is an important initial parameter for the sintering process.

The construction material is always applied in a "defined layer" or "layer thickness", which is individually adjusted according to the construction material and the process conditions. It is, for example, 0.05 to 0.5 mm, preferably 0.1 to 0.3 mm.

"Gap" or "gap opening" as used in the disclosure refers to the means through which particulate material is applied by the recoater or to the construction platform, respectively, and by means of which the applied amount of particulate material can be controlled. The particulate material exits the recoater through the "gap" or "gap opening" and flows onto the construction platform. The "closure" or "recoater closure" controls the amount of particulate material released.

A "coating blade" or "oscillating blade" in the sense of the disclosure relates to a means of a recoater device facing the construction platform, which may be combined with further means to control the application of particulate material. The "coating blade" can form a gap with another part or means of the recoater device, which gap is closed by a material cone at standstill. In the present disclosure, the "coating blade" is closed and opened by a controllable closure, e.g. a spring steel sheet, thereby controlling the application of particulate material to the construction field.

A "closure device" in the sense of the disclosure relates to the combination of coating blade, controllable closure and actuator in a particulate material recoater.

A "closure means" or "closure" or "coater closure" in the sense of the disclosure is a means that allows the gap of the recoater to be closed and opened in a controlled manner. This may be a spring steel sheet, for example.

An "actuating means" or "actuator" in the sense of the disclosure is used to open and close the closure means.

"Opening speed" in the sense of the disclosure means the length of time it takes for the closure means to be driven from its closed position to its maximum opening.

In the sense of the disclosure, "closure opening process" refers to the process of moving the closure means from its closed position to its open position. Accordingly, a "closure closing process" is the reverse process.

"Travel speed" in the sense of the disclosure refers to the speed of advancing or retracting the recoater. The travel speed and the opening speed are important variables that influence the process sequence, the production speed for 3D moldings and the control of the start-up and the printing process. Thus, these variables also influence the cost-effectiveness of a 3D printing apparatus.

"Core cleaning station" or "cleaning station" as used in the disclosure means a container or housing or partitioned space into which 3D moldings may be introduced and which are partially or substantially completely freed of particulate material by various means. The cleaning station may have a closable opening or means to substantially prevent particulate materials escaping from the interior, such as a curtain or rows of brushes. The cleaning station as defined in the disclosure may include further means useful for cleaning such as recycling means, reservoirs, holding means, fastening means, controllable or/and movable air or material nozzles.

"Beads" in the sense of the disclosure are particulate parts which may be round or/and rounded or/and structured and which are brought into contact with the 3D molding to be cleaned or wherein the 3D molding is introduced or immersed therein. The "beads" can also advantageously penetrate a complex geometry by means of an air flow and thus detach non-solidified particulate material from the 3D molding, thereby freeing the latter from such material. The beads can be made of different materials or mixtures of materials. For example, zeolites, orange gel, silica gel, one or more clay minerals, one or more diatomites or/and one or more sepiolites can be used.

A "container for receiving beads" as defined in the disclosure is any means in which beads can be provided or returned and which has a volume of between 10 liters and 1,000 liters in volume.

"Means for recycling beads" as defined in the disclosure refers to any means used to collect, transport or/and vacuum beads and to guide or return them to a container for receiving beads.

A "depositing means" in the sense of the disclosure is any suitable means, such as a receiving unit, a surface for depositing, a surface for depositing 3D moldings, which preferably has a fixing means for fixing one or more 3D moldings and which is preferably movable or/and pivotable in its X, Y, Z axis.

"Gripping means" in the sense of the disclosure can be any device that can pick up a 3D molding in a controlled manner and transport it to another location in space or simply fix it in place; it may be, for example, a robotic device that can be moved and controlled three-dimensionally.

The various aspects of the invention will be described in more detail below.

In one aspect, the invention relates to a cleaning station suitable for cleaning 3D moldings, comprising a housing with an opening, optionally closable, means suitable to generate a bead jet or/and means suitable to generate an air jet, or/and a container for receiving beads, means for recycling beads, optionally a depositing means, which is preferably movable in its X, Y, Z axis or/and is pivotable, or/and wherein the depositing means has a depositing surface for the 3D molding or/and the depositing surface has a fixing means for the 3D molding.

In another aspect, the disclosure relates to a 3D printing apparatus comprising a cleaning station as described above and other components common in 3D printing.

With the cleaning station according to the invention and the 3D printing apparatus, a particularly advantageous solution has been provided to solve the problem underlying the application.

Surprisingly, using the above apparatus components in the combination shown, very advantageous time and cost savings were achieved.

Furthermore, with the apparatus according to the invention, the above-described problems or disadvantages are at least reduced or avoided completely.

The cleaning station described herein may further include or comprise means for recycling beads, wherein the means for recycling may be a tube chain conveyor.

The cleaning station as disclosed herein uses beads which, by means of a bead jet, partially or substantially completely free the 3D molding from non-solidified particulate material and thus clean it; the beads of the bead jet or in the container in the cleaning station consist of or comprise zeolites, orange gel, silica gel, one or more clay minerals, one or more diatomites or/and one or more sepiolites.

In another aspect, the disclosure relates to a cleaning station as described herein, wherein the beads are cleaned by means of a cleaning means, the cleaning means preferably being disposed inside or outside the cleaning station. For example, the cleaning means may be located outside of and above or below the cleaning station and it may include, for example, a contaminant separation means.

In another aspect, the disclosure relates to a 3D printing apparatus coupled to the cleaning station described above. Such 3D printing apparatuses are known to the skilled person and therefore need not be described in further detail here. Well-known manufacturers of such systems include 3D-Systems Inc, voxeljet AG or Stratasys. The 3D printing apparatus is coupled to the cleaning station via a robot with gripping means or/and swiveling means such as a swiveling gripper arm or with other suitable conveying means. It is thus possible to achieve semi-automation or automation of 3D molding production using known 3D printing processes, such as powder-based 3D printing processes with selective binder impression or laser sintering or high-speed sintering, etc., and of the cleaning of the parts and, if necessary, of the further processing of the 3D moldings. As a result, very advantageous time benefits, cost benefits and work quality benefits can be achieved for the operating personnel.

In another aspect, the disclosure relates to a method of manufacturing 3D moldings using any known 3D printing machine and 3D printing method that can be used according to the disclosure coupled with a cleaning station as described herein. In a further aspect of such a method, there can also be further coupling after the cleaning station via conveying means to further processing stations and process steps, and thus further semi-automation or automation can be achieved.

A method according to the disclosure for cleaning 3D moldings comprises the following steps: a 3D molding is introduced into the cleaning station, preferably the cleaning station is substantially closed and the 3D molding is exposed to beads or a bead jet, the 3D molding being optionally exposed to an air jet in a further step.

In such a method, the 3D molding can be exposed to the beads from one side or from multiple sides. It is also possible to move the 3D molding in a jet of beads, or the beads circulate in a container and flow around the 3D molding and/or through the cavities of the 3D molding. For example, in one step the 3D molding can be exposed to a bead jet or a horizontal bead shower or can be introduced into a container with beads, the beads preferably being introduced into the container only after the 3D molding has been introduced, preferably wherein the container can be pivoted or/and moved in the X, Y or/and Z direction. Furthermore, the container itself may also have means suitable to achieve a movement of the beads and thus to cause or promote a movement through cavities of the 3D molding.

In another aspect, the 3D molding is moved in the X, Y, and/or Z directions while exposed to the bead jet or while in the container with the beads.

It can be advantageous if the beads of the bead jet are recycled in a circuit, preferably by means of tube chain conveyors, preferably returned to a bead storage container, the bead storage container being positioned in the vicinity of the cleaning station or, for example, being positioned at the top of the cleaning station, or/and a bead collection tray being fitted at the bottom of the cleaning station, which tray returns the beads to the bead storage container after irradiation of the 3D molding.

In a further process step, the 3D molding can be exposed to an air jet, preferably by means of air nozzles, the air nozzles and/or the air jet being adjustable in their jet directions. Furthermore, one or more air nozzles may be attached to or constitute an air nozzle holder, and this air nozzle holder may itself also be movable or/and pivotable in various directions.

In the method according to the disclosure, the bead jet may be combined with an air jet.

The 3D molding can be introduced into the cleaning station by gripping means or manually, preferably wherein the gripping means is a robotic device that is controllable three-dimensionally or another suitable conveying means that can effect the transfer of the 3D molding produced by the 3D printing process from the printing apparatus to the cleaning station.

A method as described herein, wherein the 3D molding is removed directly from the 3D printing apparatus by gripping means and is introduced into the cleaning station by gripping means, preferably wherein the 3D molding is positioned in a holding frame.

Furthermore, the 3D molding can be held on the gripping means in the cleaning station or positioned on a depositing means.

In the disclosed method, the 3D molding can be positioned on a depositing means and fixed thereon, wherein the depositing means can be moved or/and pivoted in its X, Y, Z axis or/and has a depositing surface for the 3D molding or/and the depositing surface has a fixing means for the 3D molding. The cleaning station can also simply have a depositing surface for the 3D molding, which may optionally have holding means for the 3D molding.

LIST OF REFERENCE NUMERALS

1 automatic vertical platform guidance
2 core support (support) for 3D molding (molding)
3 automatic bead circulation, e.g. with tube chain conveyor
4 adjustable and/or swiveling air nozzles
5 cabinet opening with closing means (door(s) or curtain or row of brushes)
6 container with beads in which the 3D molding can be immersed
7 handling robot with swivel arm and gripping device or holder for 3D molding
8 beads, e.g. silicate beads

9 3D molding (part)

10 core cleaning station

What is claimed is:

1. A cleaning station suitable for for removing a residual powder from a 3D molding, comprising:

a housing with an opening, wherein the opening is optionally closable, a bead shower generator for generating a bead shower or a container for receiving beads, and a depositing means, wherein the depositing means movable in X, Y, Z axes of the depositing means or is pivotable;

wherein the depositing means has a depositing surface for the 3D molding, or a fixing device for the 3D molding;

wherein the bead shower generator primarily removes non-solidified residual powder from the 3D molding, thereby freeing the 3D molding from the non-solidified residual powder;

wherein the bead shower generator is free of an air jet and the cleaning station optionally includes an air jet generator for cleaning the 3D molding after cleaning with the bead shower.

2. The cleaning station according to claim 1, wherein beads from the cleaning station are cleaned by a cleaning means, the cleaning means being disposed inside or outside the cleaning station, optionally, wherein the cleaning means is located outside of and above or below the cleaning station;

wherein the cleaning means separates a contaminant from the beads.

3. The cleaning station according to claim 1, wherein the cleaning station includes the bead shower generator, wherein the cleaning station includes a means for recycling beads from the bead shower, wherein the means for recycling beads includes a tube chain conveyor or a vacuum conveyor, and wherein the beads of the bead shower or the beads in the container includes beads selected from the group consisting of zeolites, orange gel, silica gel, one or more clay minerals, one or more diatomites, one or more sepiolites, and any combination thereof.

4. A 3D printing apparatus, comprising the cleaning station of claim 1, and a recoater for applying particulate construction material in layers of 0.05 to 0.5 mm on a construction field.

5. A method for cleaning a 3D molding, wherein the 3D molding is cleaned with the cleaning station of claim 1.

6. A method for cleaning 3D moldings, wherein a 3D molding is introduced into the cleaning station according to claim 1, the cleaning station optionally being substantially closed; wherein the 3D molding is exposed to the bead shower or is introduced into the container with beads; optionally, wherein the container can be pivoted and/or moved in the X, Y and/or Z directions.

7. The method according to claim 6, wherein the 3D molding is moved in the X, Y, and/or Z directions while exposed to the bead shower or while in the container with the beads, or/and;

wherein the beads of the bead shower are recycled in a circuit, optionally by means of tube chain conveyors or vacuum conveyors, wherein a bead storage container is positioned above or below the cleaning station, or a bead collection tray is positioned at the bottom of the cleaning station;

wherein beads from the bead shower are cleaned and separated from contaminants before returning to the bead shower generator.

8. The method of claim 6, wherein the 3D molding is introduced into the cleaning station by gripping means or manually, optionally, wherein the gripping means is a robotic device that is three-dimensionally controllable.

9. The method of claim 6, wherein the 3D molding is removed directly from a 3D printing apparatus by gripping means and is introduced into the cleaning station by the gripping means, optionally wherein the 3D molding is positioned in a holding frame.

10. The method of claim 6, wherein the 3D molding is:

held on a gripping means in the cleaning station wherein the 3D molding is cleaned in this position, or positioned on the depositing means wherein the depositing means can be moved and/or pivoted in X, Y, Z axes of the depositing means and/or the depositing means has a depositing surface for the 3D molding and/or the depositing means has the depositing surface for the 3D molding and the depositing surface has the fixing device for the 3D molding.

11. The cleaning station of claim 1, wherein the cleaning station comprises a means for recycling beads.

12. The cleaning station of claim 11, wherein the cleaning station includes the depositing means which is pivotable or movable in its X, Y, Z axes, wherein the depositing means has the depositing surface for the 3D molding or the fixing device for the 3D molding.

13. The cleaning station of claim 2, wherein the cleaning means is located outside of and above or below the cleaning station.

14. The cleaning station of claim 2, wherein the cleaning station includes a means for recycling beads having a tube chain conveyor.

15. The cleaning station of claim 2, wherein the cleaning station includes a means for recycling beads having a vacuum conveyor.

16. The cleaning station of claim 2, wherein the beads of the bead shower or the beads in the container include beads of a material selected from the group consisting of a zeolite, an orange gel, a silica gel, one or more clay minerals, one or more diatomites, one or more sepiolites, or any combination thereof.

17. A method for removing a residual particulate material from a 3D molding comprising steps of:

i) introducing the 3D molding into a cleaning station, wherein the 3D molding is partially freed of particulate material and the 3D molding includes the particulate material bound by a binder; and ii) exposing the 3D molding to a bead shower, wherein the bead shower primarily removes the residual particulate material from the 3D molding, thereby freeing the 3D molding from the residual particulate material;

wherein the cleaning station comprises a housing with an opening, and a container in which beads can be provided to the bead shower or returned to the bead shower;

wherein the bead shower is generated by a bead shower generator that is free of an air jet.

18. The method of claim 17, wherein the beads and the particulate material are different materials, wherein the beads are round or rounded;

wherein the 3D molding is formed of the particulate material bound by the binder;

optionally, wherein the beads include a zeolite, an orange gel, a silica gel, a clay mineral, a diatomite, or a sepiolite;

optionally wherein the method includes a step of cleaning the beads, including separating the beads from a contaminant;

optionally wherein the method includes manufacturing the 3D molding in a device including a coater for generating a defined layer of the particulate material on a construction platform or inclined plane;

optionally wherein the particulate material includes a polymer, a ceramic, or a metal.

19. The method of claim 17, wherein:

the beads and the particulate material are different materials;

the beads are round or rounded;

the beads include a zeolite, an orange gel, a silica gel, a clay mineral, a diatomite, or a sepiolite;

the method includes a step of cleaning the beads, including separating the beads from a contaminant;

the method includes manufacturing the 3D molding in a device including a coater for generating a defined layer of the particulate material on a construction platform or inclined plane; and the particulate material includes a polymer, a ceramic, or a metal.

20. The method of claim 17, wherein the 3D molding includes joined particulate material, wherein the cleaning station removes loose particulate material from the joined particulate material.

21. A method for cleaning a 3D molding with the cleaning station of claim 1, the method comprising steps of:

i) introducing the 3D molding into a cleaning station, wherein the 3D molding is partially freed of particulate material;

ii) cleaning the 3D molding with beads in the cleaning station; and iii) separating the beads from a contaminant.

22. The method of claim 21, wherein the beads and the particulate material are different and the beads are round or rounded;

optionally, wherein the cleaning station cleans the 3D molding with a bead shower;

optionally, wherein the bead shower is combined with an air jet;

optionally, wherein the cleaning station includes a container having a volume of 10 to 1,000 liters for receiving beads;

optionally, wherein the beads are collected, transported or vacuumed and returned to a container for receiving beads.

23. The method of claim 21, wherein:

the beads and the particulate material are different and the beads are round or rounded;

the cleaning station cleans the 3D molding with a bead shower;

the bead shower is combined with an air jet;

the cleaning station includes a container having volume of 10 to 1,000 liters for receiving beads; and the beads are collected, transported or vacuumed and returned to a container for receiving beads.

24. The method of claim 21, wherein the 3D molding includes joined particulate material, wherein the cleaning station removes loose particulate material from the joined particulate material.

25. A method for removing unjoined particulate material from a 3D molding comprising the steps of:

i) constructing the 3D molding in a 3D printing device including a coater or recoater, wherein the 3D molding has a predetermined shape and is formed of particulate material joined by a binder in a bed of the unjoined particulate material;

ii) conveying the 3D molding from the 3D printing device to a cleaning station with a robotic device, wherein the 3D molding is partially freed of unjoined particulate material; and iii) cleaning the 3D molding in the cleaning station with beads;

wherein the cleaning station primarily removes loose particulate material from the joined particulate material, wherein the joined particulate material remains in the 3D molding;

wherein the cleaning station includes a bead shower generator that is free of an air jet.

26. The method of claim 25, wherein the cleaning station has brushes and the cleaning station has a housing and a closable opening;

optionally, wherein the beads are rounded and different from the particulate material;

optionally, wherein the cleaning of the 3D molding is automated;

optionally, wherein the cleaning station includes a depositing means including a receiving unit or a surface for depositing the 3D molding, wherein the depositing means is movable or pivotable.

27. The method of claim 25, wherein:

the cleaning station has brushes and the cleaning station has a housing and a closable opening;

the beads are rounded and different from the particulate material;

the cleaning of the 3D molding is automated;

the cleaning station includes a depositing means including a receiving unit or a surface for depositing the 3D molding; and the depositing means is movable or pivotable.

* * * * *